US012208562B2

(12) United States Patent
Winzinger

(10) Patent No.: US 12,208,562 B2
(45) Date of Patent: Jan. 28, 2025

(54) VALVE WEAR MONITORING

(71) Applicant: KRONES AG, Neutraubling (DE)

(72) Inventor: Frank Winzinger, Regensburg (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 18/106,731

(22) Filed: Feb. 7, 2023

(65) Prior Publication Data

US 2023/0286204 A1    Sep. 14, 2023

(30) Foreign Application Priority Data

Mar. 8, 2022   (DE) ............... 10 2022 105 440.3

(51) Int. Cl.
  *B29C 49/78*  (2006.01)
  *B29C 49/58*  (2006.01)
  *F16K 37/00*  (2006.01)

(52) U.S. Cl.
  CPC .............. *B29C 49/78* (2013.01); *B29C 49/58* (2013.01); *F16K 37/0041* (2013.01)

(58) Field of Classification Search
  CPC ......... B29C 49/78; B29C 49/58; F16K 37/00; F16K 37/0041; F15B 15/2807; F27D 19/00
  See application file for complete search history.

(56) References Cited

U.S. PATENT DOCUMENTS 7,263,781 B2 *   9/2007  Sielemann ......... G01R 33/0094
                                              33/708
2009/0102082 A1  4/2009  Gattolliat et al. ........... 264/40.3
2012/0292834 A1* 11/2012 Palsson ............... C25C 3/14
                                              266/78
2015/0042021 A1*  2/2015 Schmid ................ B29C 49/16
                                              425/530
2020/0262129 A1   8/2020 Linke et al. .......... B29C 49/786

FOREIGN PATENT DOCUMENTS

| DE | 102013103543 | * | 9/2014 | ............ B29C 49/42 |
| DE | 102020201300 |   | 8/2021 | ............ F15B 15/28 |
| EP | 2808153      |   | 12/2014 | ............ B29C 49/58 |
| EP | 3530431      |   | 8/2019 | ............ B29C 49/42 |
| WO | 2020226921   |   | 11/2020 | ............ B29C 49/78 |

OTHER PUBLICATIONS

DE102013103543 English translation prepared Apr. 9, 2024 (Year: 2024).*
Partial Search Report issued in EP Appln. Serial No. 22215469.2-1014, dated Jul. 11, 2023, with machine English translation, 16 pages.

* cited by examiner

*Primary Examiner* — Alison L Hindenlang
*Assistant Examiner* — Shibin Liang
(74) *Attorney, Agent, or Firm* — HAYES SOLOWAY P.C.

(57) ABSTRACT

Disclosed is an apparatus and a method for treating containers with a transport device for transporting a container along a predetermined transport path, wherein the apparatus includes at least one container treatment device and preferably a plurality of container treatment devices, wherein the at least one container treatment device has at least one wear element, wherein the at least one container treatment device has a wear detection device for detecting wear data relating to wear of the at least one wear element. The wear detection device includes at least one sensor device for detecting the wear data relating to the wear of the at least one wear element.

19 Claims, 9 Drawing Sheets

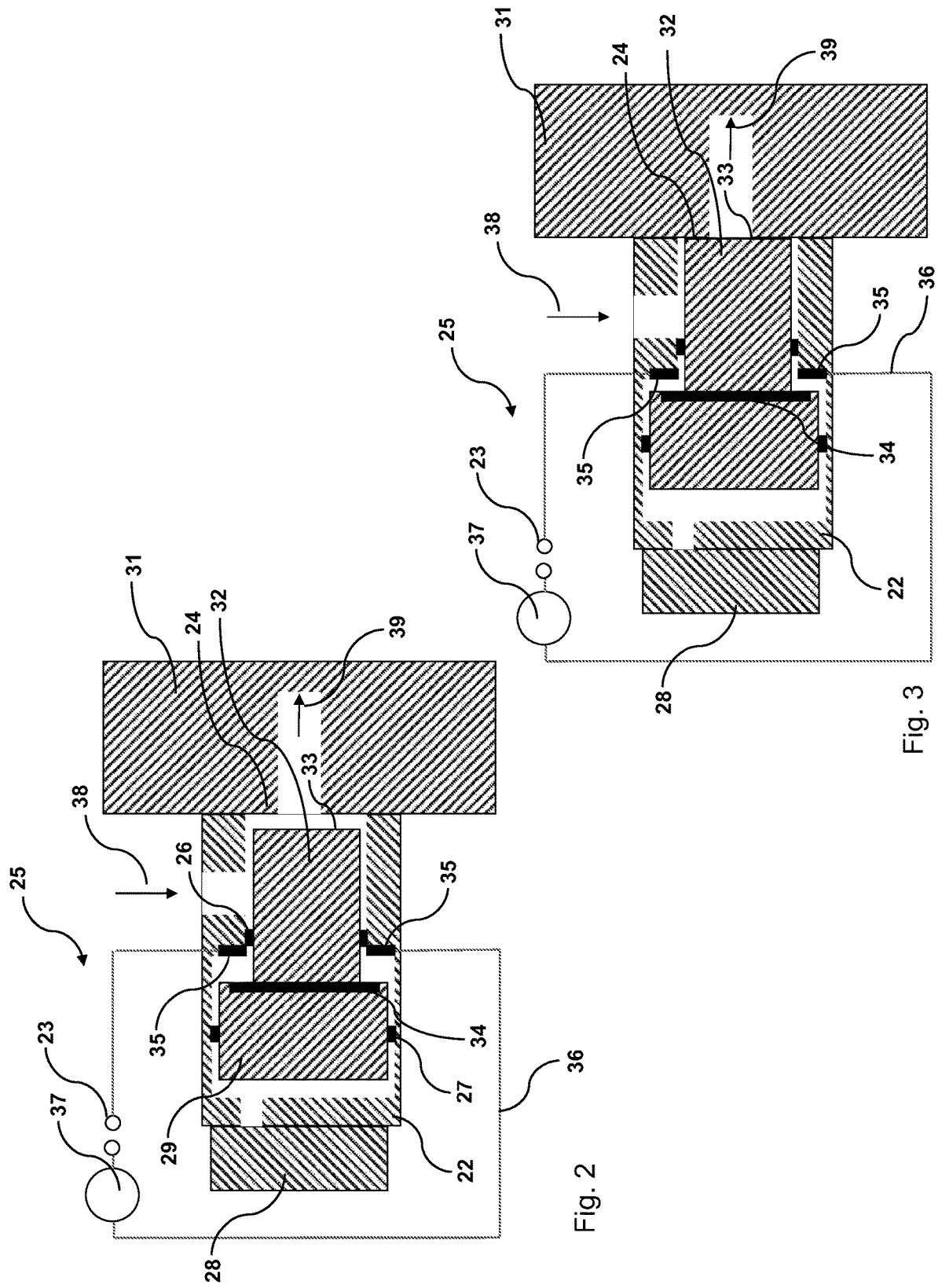

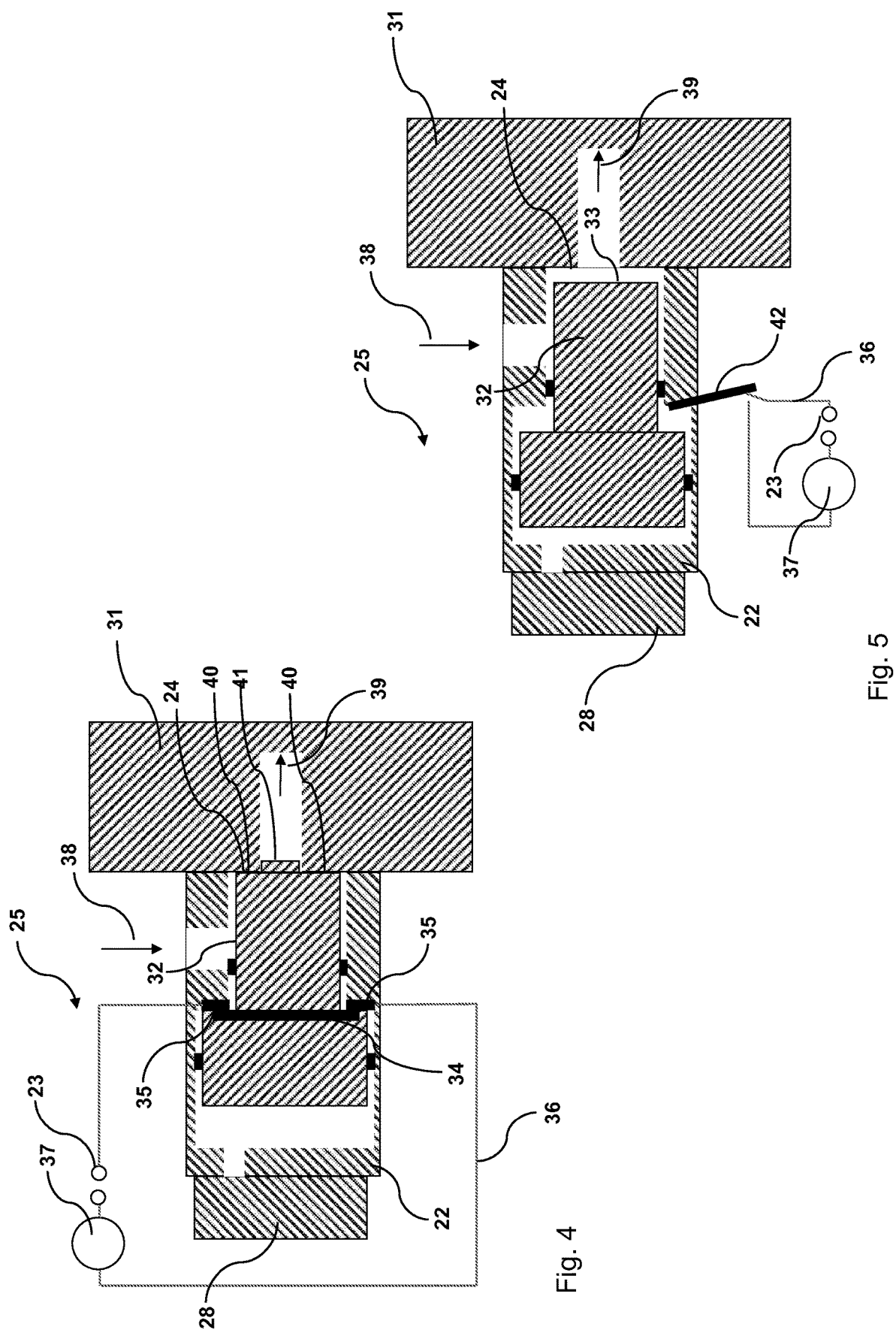

VALVE WEAR MONITORING

BACKGROUND OF THE INVENTION

The present invention relates to apparatus and methods for treating containers.

In the beverage industry, the use of plastic containers, e.g. PET bottles, and their production in blow moulding machines has been known for a long time. For example, there are blow moulding machines for the production of plastic containers in which a plurality of blowing stations are arranged on a rotating transport starwheel and in which heated preforms are continuously fed into the blowing stations in order to expand them—after closing the blow mould and sealing—against the inner walls of the blow mould by means of compressed air, but sometimes also by means of liquid.

To provide compressed air, there is usually a valve unit on each blowing station that controls the supply and also (usually) the discharge of blowing air to and from the plastic containers by means of valves.

It is also known to pre-blow said preforms first with a first pressure and at least temporarily simultaneous stretching by means of a stretching bar and then to finish blowing the preforms with a second pressure, which is greater than the first pressure, wherein for this purpose there are usually two compressed air reservoirs, for the first and the second pressure, and two valves associated with the respective compressed air reservoirs are fitted to release the line from the compressed air reservoir into the preform to be formed. Usually, an additional valve is also provided for discharging the compressed air, for example into a silencer and/or into the environment.

The valves used here are generally wearing parts and must therefore be replaced from time to time. The time of replacement should ideally be chosen so that the corresponding valves still fulfil their function, but are nearing the end of their service life. In order to determine the optimal time for maintenance work to replace the valves, it is necessary to monitor the state of wear of the valves.

In the prior art, a system is known from WO 2020/226921 A1, which has a sensor device in the context of a system for the production of containers, for recording data relating to the production process and relating to the produced container. This can be done, for example, by sensors for determining the ambient temperature, the atmospheric pressure, the humidity or the power consumption of the system or by sensors of the blow mould, for example, comprising an oven temperature sensor, pressure sensor, mould temperature sensor and the like. Likewise, the wall thickness of the manufactured containers can be detected, for example. Based on the recorded data, the system can issue suggestions for maintenance work, for example a suggestion for replacing a seal of the blow moulding machine or a nozzle of the blow moulding machine, etc.

The systems known in the state of the art for monitoring components of the plant for the production of containers, in particular with regard to wearing parts, have the disadvantage that data is acquired indirectly and is therefore inaccurate and cannot be assigned to an individual valve, for example, but only to an entire valve arrangement.

SUMMARY OF THE INVENTION

An apparatus according to the invention for treating containers comprises a transport apparatus for transporting a container (and preferably a plurality of containers) along a predetermined transport path, wherein the apparatus comprises at least one container treatment device and preferably a plurality of container treatment devices. The at least one container treatment device comprises at least one wear element and preferably a plurality of wear elements, wherein the at least one container treatment device comprises a wear detection device for detecting wear data relating to wear of the at least one wear element.

According to the invention, the wear detection device comprises at least one sensor device for detecting the wear data relating to the wear of the at least one wear element.

Preferably, the container to be treated is a plastic container, for example a PET plastic container. Preferably, the container is a plastic preform and particularly preferably a plastic bottle. Preferably, the apparatus is an apparatus for forming plastic preforms into plastic containers and in particular plastic bottles.

Preferably, the container treatment device, i.e. the above-mentioned apparatus is a blow moulding machine for the production of plastic containers or, particularly preferably, a filling device for filling containers. Furthermore, it is conceivable that the container treatment device is a device for disinfecting containers, in particular plastic bottles or plastic preforms, preferably a labelling device, particularly preferably a packaging device or preferably a cleaning device.

Preferably, the container treatment device has at least one wear element and particularly preferably a plurality of wear elements. Preferably, the wear element is a valve for the supply and/or discharge of a flowable medium, in particular for the supply and/or discharge of compressed air. Furthermore, it is conceivable that the wear element is a valve for the supply and/or discharge of a fluid medium, for example a beverage to be filled, a disinfectant or the like. For example, the valve can be a two-way valve or a three-way valve.

The valve can also be a flow-adjustable valve in which, for example, a maximum flow of the flowable medium can be set. The flow-adjustable valve can be continuously adjustable to different opening cross-sections or valve piston positions. It can be a proportional valve, for example.

Preferably, the at least one container treatment device comprises at least one wear detection device and preferably a plurality of wear detection devices for detecting a wear behaviour of the at least one wear element.

Preferably, a wear detection device is set up for monitoring the wear behaviour of a wear element and particularly preferably for monitoring the wear behaviour of a plurality of wear elements. Preferably, a wear detection device monitors the wear behaviour of a wear element at intervals (e.g. every revolution of a blower wheel or once a day or once an hour) and particularly preferably continuously.

Preferably, the wear behaviour of a wear element comprises a wear of a (movable) component, more preferably an abrasion of such a component. Preferably, the wear behaviour of a wear element is dependent on the material of which the wear element is made and more preferably on the material of which an element in contact with the wear element is made. For example, the wear behaviour of a valve, in particular a valve piston, is dependent on its material and preferably dependent on the material of the contact surface, for example the valve seat, on which the valve piston rests in a closed state of the valve.

For example, the wear element may comprise a plastic material, at least in some areas, which wears out. The element in contact with the wear element may comprise, at least in some areas, a metal or a metal-retaining alloy. In the case of a valve, a contact surface of a valve piston of the valve, which performs the function of a sealing surface, may comprise plastic. Preferably, the main part of the valve piston may be made of plastic. The surface of the valve seat against which the piston rests may have said metal or alloy. Said plastic may comprise PET or be PET.

Preferably, the wear behaviour of the wear element is dependent on the operating conditions. For example, the wear behaviour depends or can depend on the operating temperature or the operating pressure. In the case of a valve, for example, the wear behaviour depends on the nature of the flowable medium passing through. For example, the flowable medium is compressed air, a gas for disinfection, which may have corrosive properties, a liquid to be filled or a liquid sterilization means, which may have corrosive properties and/or tend to form solid deposits. In the case of gases, the wear behaviour depends on the prevailing pressure conditions. Furthermore, the wear behaviour of a wear element, in particular a valve, comprises the wear behaviour of seals associated with the wear element. For example, the wear behaviour of such seals is also dependent on the factors mentioned (such as temperature, pressure, type and properties of the medium passing through).

According to the invention, the at least one wear detection device comprises at least one sensor device for directly detecting the wear behaviour of the at least one wear element. Preferably, the at least one sensor device comprises a conventional current, voltage or resistance measuring device which is suitable and intended to measure a current flow, a voltage or a resistance. Preferably, the sensor device is arranged to output a signal to the at least one wear detection device and/or to a controller, and preferably the at least one sensor device is part of the at least one wear detection device.

Direct detection in this context means that the sensor device or at least a part of the sensor device is arranged directly on the wear element to be monitored or is arranged at least in a spatial proximity, for example within a radius of 10 cm around the wear element to be monitored.

This offers the advantage that the wear behaviour of a wear element is recorded directly and immediately and is not determined indirectly—as is known from the state of the art. In this way, a direct conclusion on the service life is possible (preferably also within the scope of an online measurement). In contrast to known systems, it is possible to monitor an individual wear element. For example, systems known from the prior art allow a conclusion to be drawn about the wear behaviour of an entire valve arrangement of a blow station of a blow moulding machine, whereas in the context of the present invention a conclusion can be drawn about each individual valve.

Preferably, the sensor device is associated with a wear element to be monitored, particularly preferably at least one component of the sensor device is arranged directly on the wear element. Preferably, the wear detection device comprises at least one and particularly preferably a plurality of sensor devices. Preferably, at least two and especially preferably a plurality of sensor devices have common components.

Preferably, the sensor device detects wear data relating to the wear behaviour of a wear element and, particularly preferably, the detected wear data are characteristic of an instantaneous state of the wear element.

Preferably, the sensor device records the wear data continuously and, particularly preferably, the recorded data can be used to draw conclusions about the wear behaviour and/or the condition of the wear element. Preferably, the sensor device records wear data in relation to the wear behaviour as a function of a condition of the wear element. Preferably, the sensor device only acquires wear data when a certain degree of wear of the wear element has been reached. Preferably, in this state the wear part is still functional, but should preferably be replaced promptly. Preferably, the sensor device continuously records wear data with regard to the wear behaviour of a wear element and particularly preferably enables real-time monitoring of the wear element and preferably during the complete service life of the valve.

In an advantageous embodiment, the at least one wear element is a valve and/or a valve piston of a valve for supplying and/or discharging a flowable medium.

Preferably, the valve comprises a valve piston which can be moved within a valve sleeve and is preferably sealed with respect thereto. Preferably, the valve sleeve is arranged on a valve block and particularly preferably a part of the valve block. Preferably, the valve has a pilot valve for controlling the movement of the valve piston and particularly preferably the pilot valve is arranged on the valve.

Preferably, a part of the sensor device is arranged on the valve piston of a valve for supplying and/or discharging a flowable medium and, particularly preferably, a part of the sensor device is a component of the valve piston. Preferably, the valve piston has a head area which has a larger diameter than the rest of the valve piston.

Preferably, the transition of the remaining valve piston to the head region of the valve piston is step-shaped and, particularly preferably, the step-shaped region (perpendicular to the longitudinal direction of the valve piston) corresponds to a step surface of the head region. Preferably, the valve piston has a contact surface which, in a closed state of the valve, rests on an associated contact surface (of the container treatment device), for example on the edge of a passage opening of a valve block and/or a valve seat. Preferably, the contact surface of the valve piston performs a sealing function between the inlet and the outlet of the valve in a closed position of the valve. Preferably, the valve piston is made of a softer material than the contact surface (of the container treatment device) associated with the contact surface of the valve piston.

Preferably, a part of the sensor device is arranged on a surface of the valve piston, wherein the surface is preferably a step surface (of the head area) of the valve piston or preferably a contact surface of the valve piston. Preferably, a part of the sensor device is arranged on the container treatment device and particularly preferably on the valve sleeve.

In an advantageous embodiment, a surface of the valve piston and an associated contact surface of the at least one container treatment device, in particular of the valve, has an electrically conductive material at least in some areas. Preferably, the surface is a step surface (of the head region) of the valve piston or, in rare cases, a contact surface of the valve piston. Preferably, the electrically conductive material is a metallic material and more preferably a metallic coating. Preferably, the associated contact surface of the at least one container treatment device, in particular of the valve, has at least two regions which comprise an electrically conductive material. Particularly preferably, the at least two areas are spaced apart from each other and have no electrically conductive connection to each other. Preferably, the surface of the valve piston has an electrically conductive material and particularly preferably an electrically conductive coating over the entire circumference of the surface.

Preferably, the valve, in particular the valve piston and the at least one container treatment device, in particular the valve sleeve, is designed in such a way that the distance between the head region of the valve piston, more precisely the stepped surface of the valve piston and the valve sleeve, in particular the region of the associated contact surface of the at least one container treatment device, in particular the valve sleeve, is dependent on the degree of wear of the valve and in particular on the degree of wear of the valve piston.

Preferably, the stepped surface of the valve piston and the associated contact surfaces of the container treatment device, in particular of the valve sleeve in the case of a non-worn valve, are spaced apart from each other, in particular independently of the movement of the valve piston during the transition from a closed to an open state or vice versa. Preferably, the distance travelled by the valve piston during a transition from a closed to an open state or vice versa increases as a function of the degree of wear of the valve and in particular as a function of the degree of wear of the valve piston. From a certain degree of wear of the valve and in particular of the valve piston, the stepped surface of the valve piston, more precisely the electrically conductive material of the stepped surface, and the associated contact surface of the at least one container treatment device, in particular the valve sleeve, more precisely the electrically conductive material of the associated contact surfaces of the at least one container treatment device, in particular the valve sleeve, come into contact in a closed state of the valve.

Preferably, depending on the wear behaviour of the valve and particularly preferably depending on the wear behaviour of the valve piston, a contact between the step surface of the valve piston and the associated contact surface of the at least one container treatment device, in particular the valve sleeve, can be established. In an advantageous embodiment, a circuit can be closed by a contact between the surface of the valve piston, wherein the surface preferably being the stepped surface (of the head region) of the valve piston or preferably the contact surface of the valve piston, and the associated contact surface of the container treatment device, preferably the contact surface of the valve sleeve.

In an advantageous embodiment, the at least one sensor device is suitable and intended to detect a current flow in the closed circuit. Preferably, the at least one sensor device comprises a current or voltage source and a measuring device for detecting a current flow. Preferably, one of the at least two areas of the associated contact surface of the at least one container treatment device or of the valve sleeve and, more precisely, the electrically conductive materials of one of the at least two areas of the associated contact surface of the at least one container treatment device or of the valve sleeve are each connected to one pole of the current source.

Preferably, a measuring device for detecting a current flow is arranged between a pole of the current source and the contact surface of the at least one container treatment device or the valve sleeve.

In the case of a non-worn valve, in a closed state of the valve there is no contact between the electrically conductive material of the surface of the valve piston, wherein the surface is preferably the stepped surface (of the head region) of the valve piston or preferably the contact surface of the valve piston, and the electrically conductive material of the associated contact surfaces of the at least one container handling device or the valve sleeve and thus no circuit is closed and accordingly no current flow can be measured. In the case of a worn valve, in a closed state of the valve, the electrically conductive material of the surface of the valve piston, wherein the surface is preferably the step surface (of the head area) of the valve piston or preferably the contact surface of the valve piston, and the electrically conductive material of the associated contact surfaces of the at least one container treatment device or the valve sleeve are in contact, whereby a circuit is closed and the measuring device can detect a current flow.

In a further advantageous embodiment, the contact surface of the valve piston, which is preferably in direct contact in a closed state of the valve with an associated contact surface (of the container treatment device, in particular of the valve block, for example the edge of a passage opening which allows the entry of a flowable medium through the valve into the valve block) and preferably assumes a sealing function, has an electrically conductive material, preferably a metallic coating. It would also be conceivable for the entire valve piston to have an electrically conductive material.

Preferably, the associated contact surface of the at least one container treatment device and in particular that of the valve block has an electrically conductive material, in particular a metallic coating, which is coated with a (soft) plastic. Preferably, the wear behaviour of the valve in this embodiment differs from the other embodiments of the present invention. Preferably, the valve piston and in particular the contact surface of the valve piston is made of a harder material than the plastic coating of the associated contact surface of the at least one container treatment device and in particular that of the valve block.

In this embodiment, it is not the valve piston or the contact surface of the valve piston that wears out over time, but the plastic coating of the associated contact surface. At a certain degree of wear, the plastic coating of the contact surface has been rubbed off or removed to such an extent that the electrically conductive material of the associated contact surface is exposed. In this state, by contacting the contact surface of the valve piston, in particular its electrically conductive material, with the exposed electrically conductive coating of the associated contact surface of the at least one container treatment device and in particular that of the valve block, an electric circuit can be closed and the current flow can be detected by a measuring device.

In an advantageous embodiment, the surface of the valve piston at an angle >1° and <179° to a vector of a direction of movement of the valve piston along which the valve piston is moved when opening or closing the valve. Preferably, the angle is between 30° and 150°, preferably between 60° and 120° and particularly preferably exactly 90°. Due to the angle, the surface can form a stop in the direction of travel of the valve piston and thus establish contact with an associated contact surface of the at least one container treatment device and in particular that of the valve block.

Preferably, the associated contact surface of the at least one container treatment device and in particular that of the valve block is at an angle >1° and <179° to a vector of a direction of movement of the valve piston along which the valve piston is moved when the valve is opened or closed. In this case, too, the angle is preferably between 30° and 150°, preferably between 60° and 120° and particularly preferably exactly 90°.

In a further preferred embodiment, the surface of the valve piston, wherein the surface is preferably the step surface (of the head region) of the valve piston or preferably the contact surface of the valve piston, and the associated contact surface of the at least one container treatment device or that of the valve sleeve do not comprise an electrically conductive material. In an advantageous embodiment, the at least one container treatment device comprises a metallic toggle switch which is suitable and intended to close an electrical circuit upon contact with the surface of the valve piston, preferably with the step surface (of the head region) of the valve piston.

Preferably, the metallic toggle switch is arranged on the at least one container treatment device. Preferably, the metallic toggle switch is arranged in a region of the at least one container treatment device, in particular in a region of the valve sleeve, in which the metallic toggle switch can be contacted by the head region of the valve piston, particularly preferably by its stepped surface, depending on the wear of the valve piston. Preferably, the metallic toggle switch is arranged in such a way that, in the case of a non-worn valve, no contact can be made between the metallic toggle switch and the head region of the valve piston, particularly preferably its stepped surface. Preferably, the metallic toggle switch is arranged in such a way that, in the case of a worn valve, contact can be established between the metallic toggle switch and the head area of the valve piston, particularly preferably its stepped surface.

Preferably, the metallic toggle switch is movably mounted and especially preferably at least partially pivotable about a pivot axis. Preferably, the metallic toggle switch has a first area which can be contacted by the head area of the valve piston and preferably a second area which is suitable and intended to close an interrupted circuit. Preferably, the application of a force to the first area of the metallic toggle switch (contacting by the head area of the valve piston) causes a (pivoting) movement of the metallic toggle switch in such a way that the second area of the metallic toggle switch executes a corresponding and preferably complementary movement. This movement corresponds to a pivoting movement about a pivot axis. Preferably, the radius of movement of the metallic toggle switch depends on the degree of wear of the valve or the valve piston. In other words, the more worn the valve piston is, the greater the radius of movement of the metallic toggle switch. In case the valve is only slightly worn, this means that in a closed state of the valve the metallic toggle switch is only slightly deflected and an electrical circuit cannot yet be closed by the second area of the metallic toggle switch. In the case of more pronounced wear of the valve piston, the metallic toggle switch is deflected further in a closed state of the valve so that the second area of the metallic toggle switch can close an electric circuit, which can be registered by the sensor device.

It is also conceivable that other (construction) forms of a switch are used instead of a toggle switch, for example those that are linearly movable.

In a further advantageous embodiment, the at least one sensor device comprises an induction sensor which is suitable and intended to detect the distance between the surface of the valve piston, preferably the step surface (of the head region) of the valve piston, and the induction sensor.

Preferably, the induction sensor is arranged on the at least one container treatment device, in particular on the valve sleeve. Preferably, the surface of the valve piston, preferably the stepped surface (of the head area) of the valve piston has an electrically conductive material, in particular a metallic coating. The movement of the valve piston during the transition between a closed and an open position of the valve induces a current flow in the induction sensor, which can be detected as a signal. Depending on the degree of wear of the valve piston, the distance travelled during the transition between a closed and an open position of the valve changes and thus the distance between the surface, preferably the step surface (of the head area) of the valve piston or its electrically conductive material and the induction sensor, whereby a different current flow is induced. This offers the advantage that the wear behaviour of the valve, more specifically the valve piston, can be detected during each movement of the valve piston. This further offers the advantage that every condition (new, little worn, heavily worn) of the valve piston can be recorded and evaluated continuously and preferably in real time over the entire lifetime of the valve.

In a further preferred embodiment, at least two or preferably more than two sensor devices or (toggle) switches can be provided per wear element, wherein preferably one sensor device is provided so that a preliminary warning can be issued before preferably a second sensor device issues a warning shortly before a final failure of the wear element, i.e. from a certain degree of wear of the wear element, or detects a final wear of the wear element.

In a preferred embodiment, the at least two or preferably more than two sensor devices may be arranged at different positions along the path of movement of the wear element.

In a further embodiment, it is conceivable that the wear element is moved by an electric motor. The at least one sensor device can be an encoder, preferably an incremental encoder or rotary encoder of the motor, via which a position of the motor and thus indirectly a position of the wear element is detected.

The motor can preferably be force-controlled and move the wear element against a stop with a defined force. If the wear element is a valve piston, the motor can press it with a defined force against the associated contact surface of the at least one container treatment device and in particular that of the valve block, preferably with a force that is greater than the force on the wear element triggered by the pressure of the flowable medium during the treatment of the container.

Preferably, data relating to the position of the motor or the encoder and thus preferably data relating to the position of the wear element in a new state of the wear element and particularly preferably in an end position of the wear element are stored in an associated control device or memory device. Preferably, the stored data contain a (set) value for a predetermined force in this position. Preferably, the motor is set up to move the wear element until the predetermined force is reached.

If the predefined force is only reached at an (end) position of the motor or the wear element which is further away from a start position related to a movement of the wear element compared to a movement of the wear element in a new state of the wear element, a wear of the wear element can be concluded. Preferably, the position of the wear element correlates directly with the degree of wear of the wear element.

In an alternative embodiment, a setpoint value range and preferably a setpoint value for a position of the wear element in an end position is predefined. If the wear element exceeds this setpoint value or this setpoint value range, wear of the wear element can be detected. Preferably, the degree of wear of the wear element correlates directly with the extent to which the setpoint value is exceeded. Preferably, several setpoint value ranges are predetermined, wherein an exceeding of the corresponding setpoint value ranges can be assigned to different degrees of wear. Thus, it can be provided that exceeding a limit of a smaller setpoint value range corresponds to a minor wear of the wear element or exceeding a limit of a larger setpoint value range corresponds to a more pronounced degree of wear.

Preferably, a continuous measurement, such as the use of an induction sensor as suggested above or monitoring the position of the motor or the can be used to detect wear behaviour over a period of time. Via this detection it is possible to better predict a final failure of the wear element.

In a further preferred embodiment, the at least one sensor device is at least partially integrated into the wear element and preferably into the valve piston of a valve and is preferably completely enclosed by the latter at least at times and at least in some areas.

Preferably, the sensor device comprises a metal part which is guided at least partially inside the valve piston. Preferably, the metal part can extend to a position within the valve piston in which it is spaced from the wearing surface in a direction in which material is removed by wear of the wear element or the valve piston, and in which the metal part is exposed over time by (progressive) wear. The metal part can be a wire.

The metal part can protrude from the wear part on the side facing away from the wear surface or contact surface of the valve piston or on the side facing sideways with respect to a direction of movement of the valve piston. An extension of the metal part can lead to a further electrical line, which is connected to a pole of a current or voltage source. It is conceivable that one pole of the current or voltage source is directly connected to the metal part via a cable. Alternatively, it is possible that the extension of the metal part is in contact with a metallic surface, for example a cylindrical metallic valve inner wall, via a sliding contact and that this is connected to one pole of the current or voltage source via an electrical line. This offers the advantage that no complex passage of an electrical line in the form of a cable through the wall of a pressurised valve is required.

The counterpart to the metal part represents a metallic coating or a metallic material within the associated contact surface of the container treatment device, which is connected to the second pole of the current or voltage source via an electrical line. Furthermore, in analogy to the embodiments described above, a measuring device is provided within one of the electrical lines, which in the case of a closed circuit can register a current flow and thus a wear of the valve piston.

In a preferred embodiment, the metal part can be guided in a valve piston, which has plastic at least in some areas. In a preferred embodiment, the metal part can be injected into a valve piston. In a further embodiment, the metal part may be printed at least in part in or on a region of the valve piston, e.g. with ink containing metal.

Alternatively, the metal part can be an insulated cable, which is guided in a valve piston, which can be made of metal at least in parts.

Preferably, the metal part is very thin at least in the area of the contact surface of the valve piston, preferably with a diameter or wall thickness <1 mm. In this way, damage to the associated contact surface of the container treatment device can be avoided.

Furthermore, it is conceivable that there are also two, preferably three or preferably more than three metal parts per piston. For example, the metal parts can be arranged in different areas of the valve piston in order to monitor different types of wear or different degrees of wear.

In a further advantageous embodiment, the at least one container treatment device, preferably a blow station of a blow moulding machine, has a valve block on which at least one valve and preferably a plurality of valves are arranged. Preferably, the valve block has a wear detection device and preferably a sensor device for detecting the wear behaviour of the at least one valve and preferably for detecting the wear behaviour of a plurality of valves.

Preferably, the wear detection device or the sensor device corresponds to one of the above-mentioned embodiments and/or a combination thereof. Here it is conceivable that each valve has its own complete sensor device, for example consisting of electrically conductive materials of the corresponding surface, wherein this is preferably a step surface (of the head area) of the valve piston or preferably a contact surface of the valve piston, preferably a metallic coating, of a corresponding electrically conductive contact surface of the container treatment device, in particular of the valve sleeve and/or the valve block, of a current source and a measuring device for detecting a current flow.

Furthermore, it is conceivable that all valves arranged on the valve block share a common current source and a measuring device and the areas with an electrically conductive material of the valve sleeves or the corresponding areas of the valve block are connected in series. In such an arrangement, the measuring device can only detect a current flow when all the valves involved have reached a certain degree of wear and thus a contact has been established between the electrically conductive materials of the corresponding surfaces of the valves and the associated contact surfaces of the container treatment device, in particular the valve sleeve or the valve block. However, a parallel connection would also be conceivable. In this case, a current flow can already be detected when one of the valves involved has reached a certain degree of wear.

Such an arrangement offers the advantage that only one power source and only one measuring device are required for a large number of valves which are arranged on a valve block, whereby the costs and the technical effort can be significantly reduced, especially with regard to maintenance work which is required, as this can be carried out at the same time for all valves.

In an alternative embodiment, each valve arranged on a valve block has its own complete sensor device, whereby each valve can be individually monitored and maintained accordingly.

In a further embodiment, it would be conceivable for a sensor device to be associated with a plurality of wear elements, in particular valve pistons. For example, it would be possible for a contactless sensor device (e.g. inductive) to be arranged stationary in the area of the transport device and for a plurality of wear elements (valve pistons) arranged on container treatment devices to move past it and thus for a measurement to be taken.

In a further advantageous embodiment, the apparatus has a communication device for transmitting, in particular for sending and/or receiving, wear data relating to the wear of the at least one wear element to a non-volatile memory device. Preferably, the communication device is suitable and intended to enable a connection of the apparatus to a local data network (for example, of the operator of the system) and, particularly preferably, a connection to a comprehensive data network (for example, of the manufacturer of the system).

A local data network can be a data network of the operator of the system, for example for central monitoring and control of the system. A comprehensive data network can be a network of the manufacturer of the system, which is connected to the local data networks of the operators of the system(s) and preferably a data exchange takes place between the data networks of the operator and those of the manufacturer.

Preferably, the communication device is part of the wear detection device or the wear detection device is part of the communication device. Preferably, the communication device is suitable and intended for sending data relating to the wear behaviour, which has been detected by the sensor device of the wear detection device, to different levels of a production management system. Preferably, in a first instance, the data is transmitted from the sensor device to a PLC level (Programmable Logic Controller) and particularly preferably in a further step to an ERP (Enterprise Resource Planning) and/or MES level (Manufacturing Execution System). Preferably, the transmitted data includes information about the wear behaviour of a wear element, in particular a valve.

Preferably, the transmitted data includes information relating to the type of wear element (valve), preferably a serial number, a model number and the like, information relating to the pressures with which the wear elements (valves) have been switched (pressures of the pilot valves), information relating to the operating hours, information relating to the flowable medium used, for example whether it is compressed air, disinfection gas or the like, or information relating to the concentration of the disinfection gas, the type of disinfection gas, the frequency of use (sterilisation cycles), number of switching cycles, force on the wear element, end positions of the wear element—in particular over a period of time. Furthermore, it is conceivable that the transmitted data includes information on external conditions of the system, for example with regard to the ambient temperature, ambient pressure, ambient humidity and the like.

Preferably, the collected data is transmitted to a non-volatile memory, in particular to a central database, for example of the manufacturer, for example via the internet to a cloud or an external server. Preferably, data from a plurality of installations are transmitted by a plurality of operators (of an installation) and centrally monitored and/or evaluated (by the manufacturer). This offers the advantage that conclusions can be drawn from the wealth of data received about the wear behaviour of a wear element as a function of a plurality of influencing factors, such as the pressure with which a valve is switched, the flowable medium used, the pressure of the same, the composition of the flowable medium (for example disinfectant gas), the operating hours, the switching cycles and the like. For example, based on the evaluated data, an operator of a system whose system does not have its own wear detection device can be forewarned that, for example, based on the operating hours of his system or the number of sterilisation cycles, a valve failure is imminent. For example, it is also possible to transfer the findings from the evaluation of the data directly to the machine control of the respective systems, whereby, for example, materials (valves) can be ordered automatically in good time with regard to the next time of wear.

If, for example, a supplier of materials for the wear element is changed, e.g. a supplier of sealing material, the properties of the new material with regard to its wear behaviour can be quickly determined in this way across all systems that are equipped with a wear detection device and shared with all operators of such systems.

Furthermore, it is possible to use the recorded and evaluated data of a system and/or a plurality of systems for the control of a system and/or a plurality of systems. For example, if a valve has reached a degree of wear at which it should be replaced, the operator of the system is informed of this. If, for example, this valve is the only valve to be replaced and corresponding maintenance work would be disproportionately expensive (e.g. stopping the entire system), the system operator can instead shut down the corresponding valve or keep it permanently closed and wait until the next scheduled maintenance, for example. In an advantageous embodiment, the at least one wear element, in particular a valve, can be controlled, in particular switched on and/or off, depending on the detected wear behaviour.

This offers the advantage that the system can continue to be operated even with a worn valve.

Furthermore, the present invention is directed to an apparatus for treating containers with a transport device for transporting a container along a predetermined transport path. The apparatus has at least one container treatment device and preferably a plurality of container treatment devices, wherein the at least one container treatment device has at least two valves via which a flowable medium can be supplied to a container and/or discharged from the container.

According to the invention, the at least one container treatment device is operable in a first and in a second operating mode, wherein in a first operating mode at least one valve is active and at least one valve is not active and in a second operating mode all valves are active. The apparatus comprises a wear detection device for detecting wear data relating to wear of one of the at least two valves.

Preferably, the at least one container treatment device has several valves which are identical in construction and/or can be used for the same task. This offers the advantage that in the event of a worn valve (monitoring by the wear detection device), this can be deactivated (shut down) and does not have to be replaced immediately. In the meantime, another valve can take over its task. In an advantageous embodiment, at least one valve and preferably all valves can be activated and/or deactivated depending on the detected wear data. In this case, it can already be provided on the system side that a valve is used for various tasks and the corresponding infrastructure is set up (for example, presence of additional lines which are out of operation in the normal state). This offers the advantage that within the framework of the system control, when a worn valve is detected, it can be automatically deactivated and switched to an alternative operating mode of a valve that is to take over its tasks. Preferably, the container treatment device can be operated in different operating modes for this purpose. For further explanations, reference is made to the following description of the method according to the invention. It is also conceivable that the container treatment device has additional connections and/or lines which can be used by an operator of the system in the event of a worn valve in order to adapt the system to the situation accordingly.

In an advantageous embodiment, the at least one container treatment device has at least three, preferably at least four and particularly preferably a plurality of valves and, in particular, a valve block on which the at least two, preferably at least three and particularly preferably the plurality of valves are arranged.

Furthermore, the present invention is directed to a method for treating containers with a transport device which transports a container along a predetermined transport path and comprises at least one container treatment device and preferably a plurality of container treatment devices. The at least one container treatment device comprises at least one wear element, wherein the at least one container treatment device comprises a wear detection device for detecting wear data relating to wear of the at least one wear element. The wear detection device comprises a sensor device. A communication device is further provided for transmitting wear data relating to wear of the at least one wear element.

According to the invention, the sensor device directly detects the wear data relating to wear of the at least one wear element.

In contrast to the methods known from the prior art, this offers the advantage that monitoring of the wear condition of a wearing part is carried out precisely and directly and not indirectly. This makes it possible to monitor the wear behaviour more precisely, which brings an improvement with regard to the technical and financial expenditure within the scope of the maintenance of a system.

On the method side, it is also proposed to transmit the recorded wear data via the communication device and to use it for the control of the own system, but also for the control or maintenance of other systems, for example by the manufacturer. The advantages resulting from this have already been described in the consideration of the apparatus according to the invention.

In an advantageous method, the at least one wear element is a valve piston of a valve for supplying and/or discharging a flowable medium. Preferably, the at least one valve can be activated and/or deactivated depending on the detected wear data.

Furthermore, the present invention is directed to a method for treating containers with a transport device which transports a container along a predetermined transport path, wherein at least one container treatment device and preferably a plurality of container treatment devices are provided. The at least one container treatment device has at least two valves for supplying a flowable medium to a container and/or discharging it therefrom.

According to the invention, the at least one container treatment device is operable in a first operating mode in which at least one valve is deactivated and at least one valve is activated and/or is operable in a second operating mode in which all valves are activated.

This offers the advantage that when a worn valve is detected, the system does not have to be stopped immediately and the valve replaced, but the system can continue to operate, for example, until the next scheduled maintenance. Preferably, a valve is activated or deactivated automatically on the basis of the detected wear data. Furthermore, it is conceivable that the system control informs the operator of the system that a valve is to be switched off on the basis of the recorded wear data and that the operator must confirm this. Furthermore, it is conceivable that the system controller informs the system operator that a valve is to be deactivated and that this must be done manually by the system operator.

Preferably, the container treatment device can be operated in a first operating mode. Preferably, at least one valve is deactivated and at least one valve is activated in such a first operating mode. Furthermore, it is conceivable that, in the case of a plurality of valves, more than one valve is or can be deactivated. Preferably, the system can be operated in a second operating mode in which all valves are activated. This corresponds to the normal operating mode.

In this context, an active or activated valve is understood to be a valve that can be activated and/or switched by the machine control within the scope of its intended functions. In this context, a deactivated valve is understood to be a valve that cannot be controlled and/or switched and/or is not controlled or switched. When a valve is deactivated, the valve is transferred to a closed position and (permanently) held in a closed position so that it can no longer be (unintentionally) switched within the scope of the processes to be carried out by the container treatment device.

An active valve is preferably switched at least once per rotation of the transport device, e.g. a blowing wheel.

The use of such different operating modes is described using the example of a container treatment device in the form of a blow moulding machine, or more precisely a blow moulding station. The blow moulding machine comprises a blow station which is connected to various pressure reservoirs via several valves. Within the pressure reservoirs, different pressure levels are present depending on the step to be performed (pre-blowing, intermediate blowing, final blowing). During normal operation (second operating mode), a plastic preform located inside the blow mould is first pressurised with the lowest pressure (pre-blowing), then with the medium pressure (intermediate blowing) and finally with the highest pressure (final blowing). Subsequently, the blow mould under the highest pressure is connected to the middle pressure reservoir in order to recycle the compressed air into it. In a further step, recycling takes place into the pressure reservoir with the lowest pressure.

The term "pressure reservoir" includes both pressure containers (e.g. tanks) and only pipes or hoses that transport flowable medium (e.g. distributors). In particular, this also includes ring channels for distributing the flowable medium to individual stations.

In particular, the wear element can perform a continuous and/or only an alternating movement along an axis during operation.

If, for example, the valve that connects the blow mould to the middle pressure reservoir is worn and has to be deactivated, the system can still be operated because intermediate blowing can be dispensed with. If, for example, the valve of the lowest pressure level is deactivated, the system can also continue to be operated and a recycling step can be dispensed with. The residual pressure can then be released from the blow mould by lifting the blow mould, for example.

In an advantageous embodiment, the at least one deactivated valve is a recycling valve in a first operating mode. In an advantageous embodiment of the method according to the invention, a change between the first operating mode and the second operating mode can be performed and/or is performed accordingly without stopping the at least one container treatment device.

BRIEF DESCRIPTION OF THE DRAWINGS

Further advantages and embodiments can be seen in the attached drawings.

In the drawings:

FIG. 2 shows a non-worn valve in the open state according to an embodiment of the present invention;

FIG. 3 shows a non-worn valve in the closed state according to an embodiment of the present invention;

FIG. 4 shows a worn valve in the closed state according to an embodiment of the present invention;

FIG. 5 shows a non-worn valve in the open state according to a further embodiment of the present invention;

DETAILED DESCRIPTION OF THE INVENTION

Figure 1:
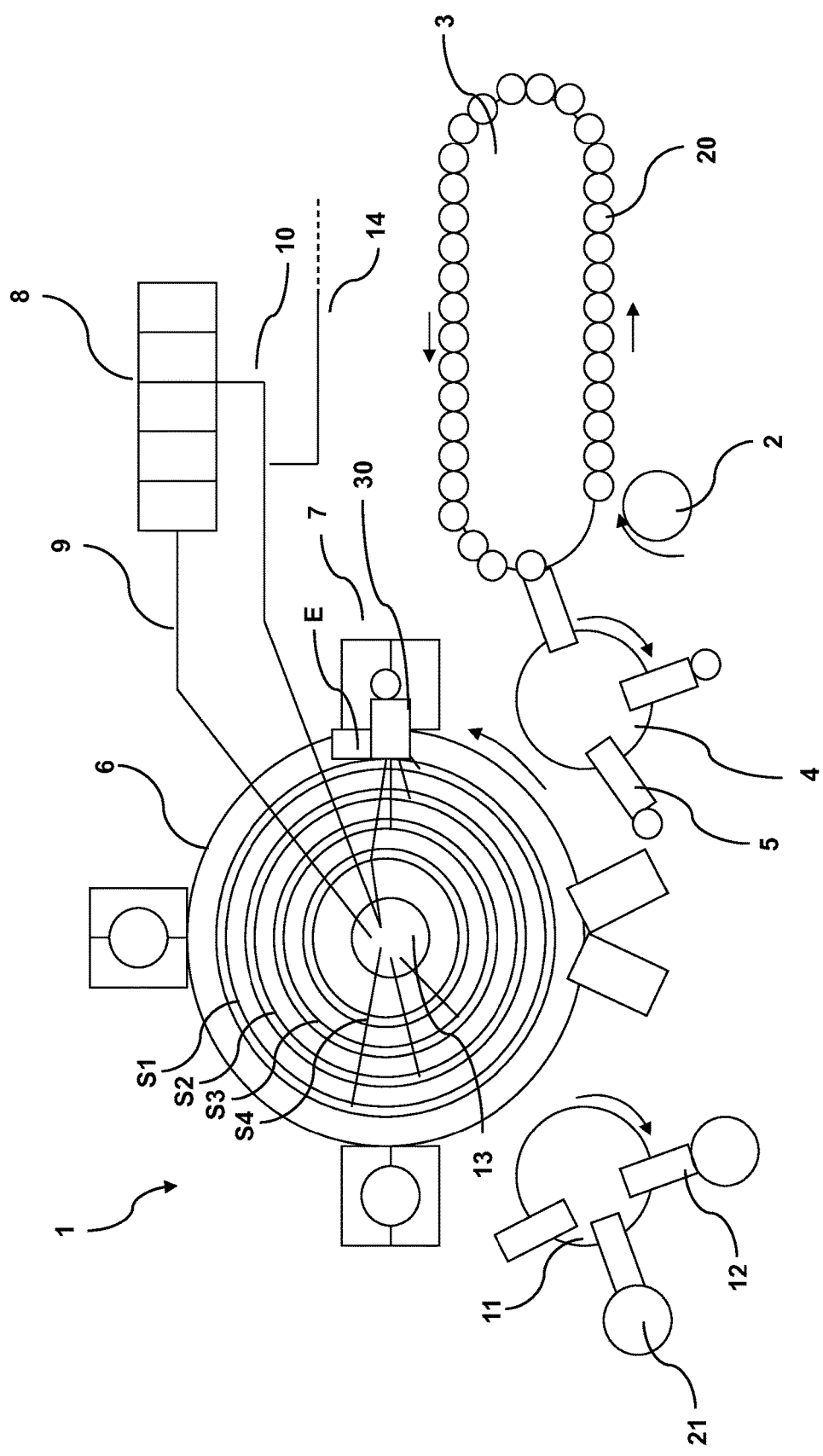
FIG. 1 shows an apparatus for treating containers.

FIG. 1 shows a schematic top view of an apparatus 1 for treating containers in the form of a blow moulding machine. In this embodiment, it is designed as a continuously operating stretch blow-moulding machine. Preforms 20 are fed via a so-called saw-tooth starwheel 2 to an apparatus for tempering 3, in which the preforms 20 are continuously passed through a heating tunnel, not shown in more detail, consisting of a plurality of infrared heaters and preferably opposing reflectors, by means of heating mandrels arranged on a circulating chain. The apparatus for tempering 3 can alternatively be a rotary machine, on the circumference of which a plurality of heating stations such as microwave resonators or heating pockets are mounted (not shown).

After tempering, the preforms 20 are transferred by grippers 5, which rotate on an infeed starwheel 4, to a blowing wheel 6, on the circumference of which a plurality of blowing stations 7 are arranged. After the forming process in the blowing station 7, the finished blown bottles 21 are removed by a removal starwheel 11. The bottles 21 are then transported to a labelling station, which is not shown, or to another unit such as a filling unit or a sterilisation unit. The transport routes of the preforms 20 and the bottles 21 are each indicated with arrows.

The individual blowing stations 7 are supplied with a gaseous medium, in this case compressed air, via a compressor (possibly with several compressor stages 8). In the first stage (shown on the right), air is compressed to a pressure of, for example, 5 bar, in the next stage to 10 bar and so on until it has a pressure of 45 bar after the final stage. The air is then fed via a supply line 9 to a rotary distributor 13, which connects the stationary part of the blow moulding machine with the rotating part (blow wheel 6).

Several pressure reducers (not shown) are also located on the rotary distributor 13 or the blowing wheel 6, which reduce the pressure provided by the compressor to different pressure levels for pressure reservoirs S1 to S3, which are also arranged on the blowing wheel 6 and are designed as ring lines. The ring lines serve as pressure reservoirs S1 to S3 or—distributors for the individual blowing stations 7 on the blowing wheel 6.

A pre-blowing pressure of, for example, 10 bar is provided in the pressure reservoir S3, an intermediate blowing pressure of, for example, 20 bar is provided in the pressure reservoir S2 and a final blowing pressure of, for example, 35 bar is provided in the pressure reservoir S1. Each blowing station 6 comprises a valve unit 30, which is connected to the individual pressure reservoirs S1 to S3 and which connects the individual pressure reservoirs S1 to S3 to the preform 20 to be blown. After the preform 20 has been sealed by means of a blowing nozzle 47 (cf. FIG. 9), it is connected to the individual pressure reservoirs one after the other and in the following order: S3, S2, S1. After the finished expansion, the air from the bottle 21—still under the final blowing pressure—is first returned to the pressure reservoir S2, advantageously until the pressure in the bottle 21 has approximately reached the pressure in the pressure reservoir S2. Then the air in the bottle 21—now approximately under the pressure of the pressure reservoir S2—is fed to the pressure reservoir S3.

It can also be advantageous to first use the pressure reservoir S3 (pre-blowing channel) for air recirculation if it is to be ensured that a minimum pressure is always provided in this. The return time can also be controlled via the pressure in a pressure reservoir S2, S3, S4 by means of a pressure sensor not shown. The pressure reducers, which provide the pressure for the pressure reservoirs S2 and S3, could also be dispensed with during production if sufficient air is recycled, but they are advantageous for starting up the blow-moulding machine.

Instead of letting the remaining air escape to the atmosphere via an outlet E, the blowing air is then fed back into the pressure reservoir S4 up to a level of 3-5 bar. Since pre-blowing from pressure reservoir S3 under a certain pressure of 10 bar in this case must represent the first step in the production of the plastic bottle, the pressure reservoir S4, due to its lower pressure level, is used in this embodiment example exclusively for (intermediate) storage or forwarding of recirculated blowing air from bottle 21 and not for blowing.

From there, the air can either still be made available on the blowing wheel 6, for example to pilot valves or other drives of the blowing stations (e.g. a drive for stretching bars), or transferred via another line and through the rotary distributor 13 back to the stationary part of the machine via line 10. From there, the air can, for example, be fed back into an intermediate stage of the compressor 8 or supplied via a line 14 to the hall compressed air network or other uses such as a bottle bottom aftercooling or a labelling or filling machine.

The pressure reservoirs S1, S2, S3, S4 can also be annular only in some areas. For example, a pressure reservoir S1, S2, S3, S4 can also be formed by two semicircular halves.

The aforementioned outlet E is present at each station 7 and is used to discharge the remaining 3-5 bar in the bottle 21 before the blowing nozzle 47 is raised again and the bottle F is removed.

Preferably, the individual blowing stations are also each assigned stretching rods which can be inserted into the interior of the plastic preforms in order to stretch them in their longitudinal direction. A control device can also control the movement of these stretching rods in coordination with the pressure application of the plastic preforms.

FIG. 2 shows a valve arrangement 25 with a non-worn valve in an open state, which is arranged on a valve block 31 of a blow station. This valve is used to supply or discharge a flowable medium, in this case compressed air. Shown here is a valve arrangement 25 during a blowing process, wherein the path of the compressed air from a pressure reservoir (supply line 38) through the valve to the blow mould (supply line 39) being indicated by arrows. A pilot valve 28 is used to control the stroke movement of the valve piston 32. The valve piston 32 has a head portion 29 which is surrounded by a seal 27 over the entire circumference for sealing between the pilot valve 28 and the valve assembly 25. The valve piston also has a seal 26 which seals over the entire circumference of the valve piston between the latter and the valve sleeve 22. Furthermore, the valve piston 32 has a contact surface 33 with which the valve piston 32 bears against a complementary contact surface 24 of the valve block 31 in the closed state of the valve.

In the embodiment of the wear detection device according to the invention shown here, it has a metallic contact surface of the valve sleeve 22, a metallic contact surface 34 on the underside of the head region 34 of the valve piston 32, a current source 23, a measuring device 37 and an electrical line 36. In this example, the contact surface 34 is at an angle of >1° and less than 179°, but preferably perpendicular to a vector of the direction of movement of the valve piston.

At this point it should be noted that the metallic contact surfaces, which are each designated with the reference sign 35, are not in electrically conductive contact with each other, but are arranged on two opposite sides with respect to the valve piston 32. The metallic contact surfaces 35 do not run along the circumference, but are preferably located at only two positions along the circumference, shown here: on two opposite sides. The metallic contact surface 34 on the underside is, for example, circular in shape and at least partially encompasses the circumference, preferably the full circumference, of the valve piston, so that in the event of contact with the metallic contact surfaces 35 an electric circuit is closed and a current flow can be detected by the measuring device 37.

FIG. 3 shows the valve arrangement 25 of FIG. 2 in a closed state. It can be seen clearly that the contact surface 33 of the valve piston 32 lies over the entire surface of the complementary contact surface 24 of the valve block 31 and thus the valve is sealed gas-tight. In a non-worn valve, the contact surface 33 of the valve piston 32 is completely flat and lies flat on the contact surface 24 of the valve block 31 in a closed state of the valve. In this state, the metallic contact surfaces 34 and 35 are spaced apart and the electric circuit is not closed, which is why the measuring device 37 cannot detect any current flow.

FIG. 4 shows a condition of the valve assembly 25 of FIGS. 2 and 3 in which the wear of the contact surface 33 of the valve piston 32 is more advanced and instead of a flat contact surface 33, it has a lower lying worn area 40, which is in contact with the contact surface 24 of the valve block 31 and a higher lying non-worn area 41, which projects a little into the channel to the blow mould. Since the valve piston 32 has travelled a further distance in a closed state of the valve, the head area 29 of the valve piston 32, more precisely the metallic contact surface 34 and the metallic contact surfaces 35 have come closer to each other, so that they now contact each other and an electric circuit is closed. The measuring device 37 registers a current flow and can thus output a signal that the valve piston 32 has reached a certain degree of wear and needs to be replaced. This offers the advantage that the wear of the valve piston 32 can be detected automatically without the need for manual removal of the valve by the operator of the system.

FIG. 5 shows a further embodiment of the present invention. Instead of metallic contacts 35 on the valve sleeve 22 and a metallic contact surface 34 on the underside of the head area 29 for closing an electric circuit, a metallic toggle switch 42 is arranged at a position which the head area 29 of the valve piston 32 hits in the event of a worn valve piston 32. This causes the metallic toggle switch 42 to move slightly and close an electric circuit, and the current flow can in turn be registered by a measuring device 37.

Figure 6:
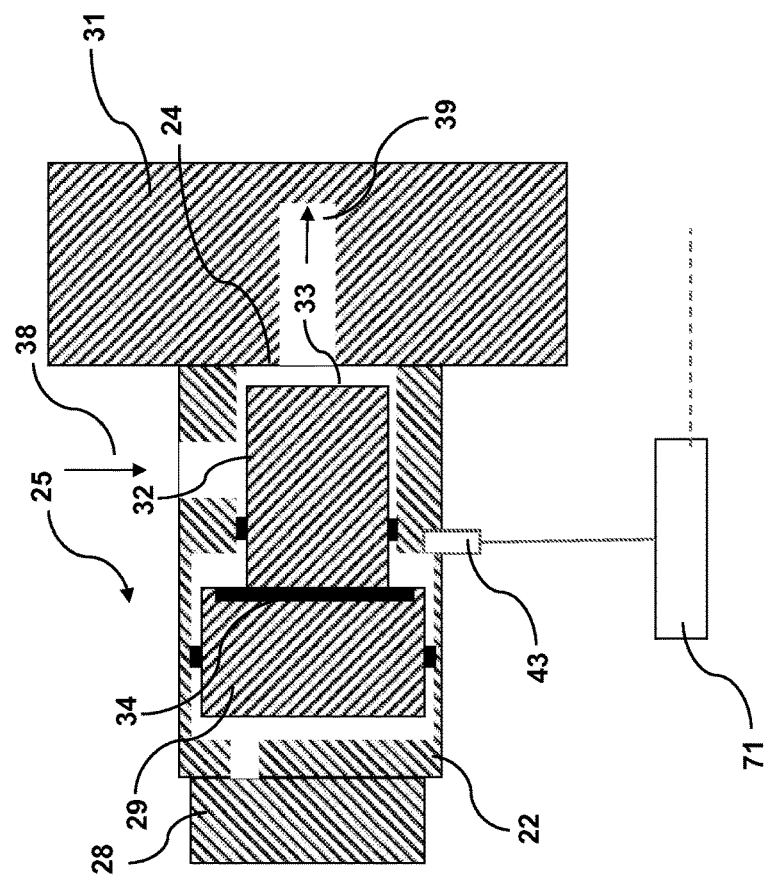
FIG. 6 shows a non-worn valve in the open state according to a further embodiment of the present invention.

FIG. 6 shows a further embodiment of the present invention. Instead of a metallic toggle switch 42 for closing an electrical circuit and detecting a current flow through the measuring device 37 (as in FIG. 5), the embodiment of FIG. 6 shows an induction sensor 43 which can detect a distance between the induction sensor 43 and the head area 29 of the valve piston 32. The data from the induction sensor 43 can be read out manually or continuously and fed directly into a data network for monitoring and/or controlling the system (s), for example to an MES and/or ERP (Manufacturing Execution System/Enterprise Resource Planning) level 71 of a production management system.

Figure 7:
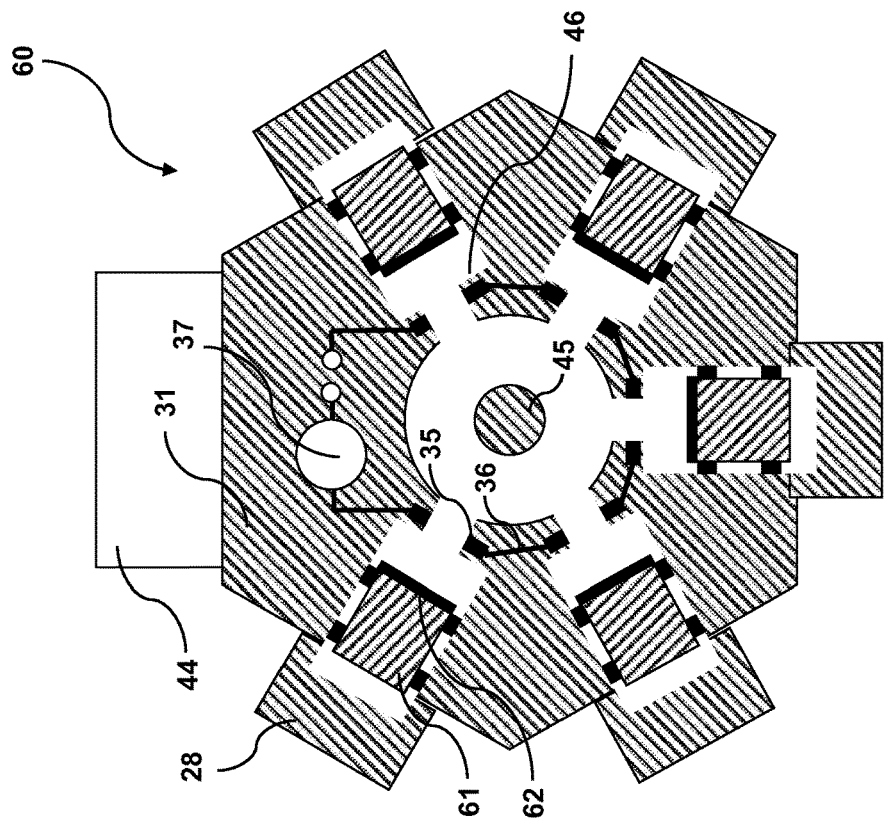
FIG. 7 shows a valve arrangement on a valve block according to an embodiment of the present invention.

In one embodiment of the present invention, FIG. 7 shows a valve arrangement 60 in which a valve block 31 is arranged on a valve block holder 44. The valve block holder 44 corresponds to a stationary carrier which is located above the blow mould and moves with the blow mould during the rotational movement of the blow wheel. Shown is an arrangement of five valves, simplified as five valve pistons 61, each having a pilot control valve 28 for controlling the movement of the valve piston 61. The five valve pistons 61 are arranged around a central opening, in the centre of which is the stretch rod 45. Following the embodiments shown in FIGS. 2 to 4, the valve pistons 61 have a metallic contact surface 62, the counterpart of which are the metallic contact surfaces 35 of the valve block 31. In contrast to the previous embodiments shown, here the metallic contact surfaces 35 are provided with a plastic sealing surface 46, which slowly wears over time and exposes the metallic contact surface 35. In this state, an electric circuit is closed by the contact of the metallic contact surfaces 35 and metallic contact surface 62. In the embodiment shown here, the mutually adjacent metallic contact surfaces 35 are each connected to one another via an electrical line 36 and are connected in series together with a measuring device 37 for detecting a current flow. In this embodiment, a current flow is only registered as soon as all five valves are worn to the extent that all plastic sealing surfaces 46 are worn to the extent that the metallic contacts 35 underneath are exposed. In an alternative embodiment (not shown), instead of connecting the metallic contact surfaces 35 in series, it is possible to connect the corresponding metallic contact surfaces 35 in a star connection (parallel connection), whereby the wear of each valve can be recorded individually.

Figure 8:
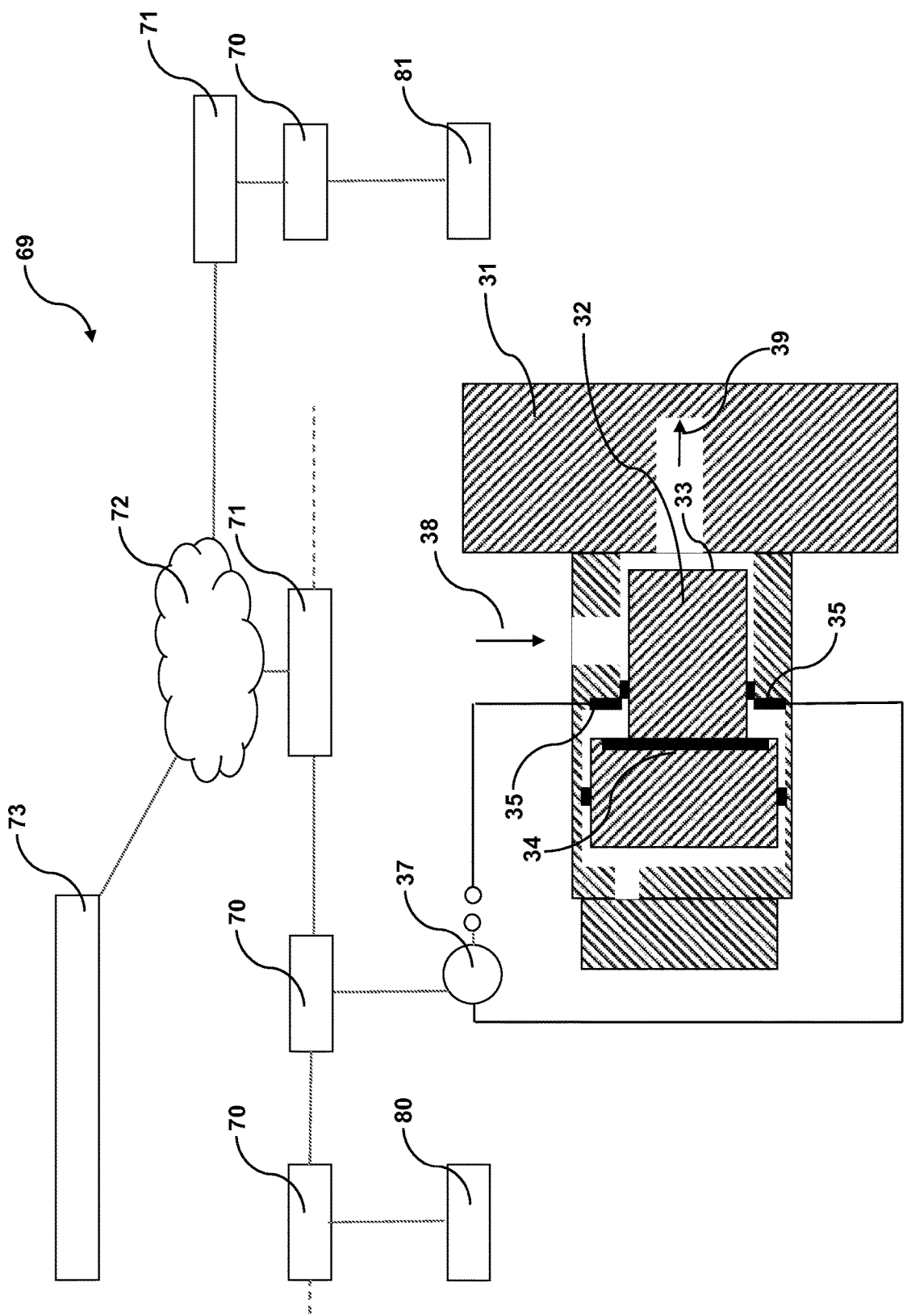
FIG. 8 shows a connection of an embodiment of the present invention to a network.

FIG. 8 shows the connection of an embodiment to a production management system 69. Such a connection applies to all embodiments shown and is shown here only for the embodiment shown in FIGS. 2 to 4 for the sake of clarity. The data acquired by a measuring device 37 relating to a current flow in a closed electric circuit (contact between the metallic contacts 34 and 35 in the case of a worn valve piston) and thus data relating to a worn valve piston 32 are transmitted to the PLC level 70 (programmable logic controller) of the production management system 69 and further transmitted to the MES and/or ERP level (manufacturing execution system/enterprise resource planning) 71. The collected data are preferably further transmitted to a central cloud 72, which is in exchange with a database/server 73. In this way, as shown here for example, data relating to the wear of a valve of a plant can be detected and stored and processed at a central location together with data from (many) further plants. This offers the advantage that information about the wear behaviour of a plurality of valves can be obtained and, for example, an expected lifetime can be concluded from this. This can be used, for example, to order replacement parts in good time or to inform the user of the system about an expected point in time at which the replacement of a valve might become necessary. The system shown here is by no means limited to valves of a blow moulding machine, but can be used for any kind of wear parts, for example in filling devices, labelling machines and the like. For example, as shown in FIG. 8, data from a filling device 80 downstream of the blow-moulding machine can be transmitted via the corresponding PLC 70 and ERP/MES levels 71, or data from external filling devices 81 can be received. All centrally detected data can be evaluated and used in the control of the various systems. For this purpose, control commands are transmitted in the appropriate sequence via the ERP/MES levels 71 to the PLC levels 70 of the individual systems, for example a blow moulding machine or a filling device 80, 81.

Figure 9:
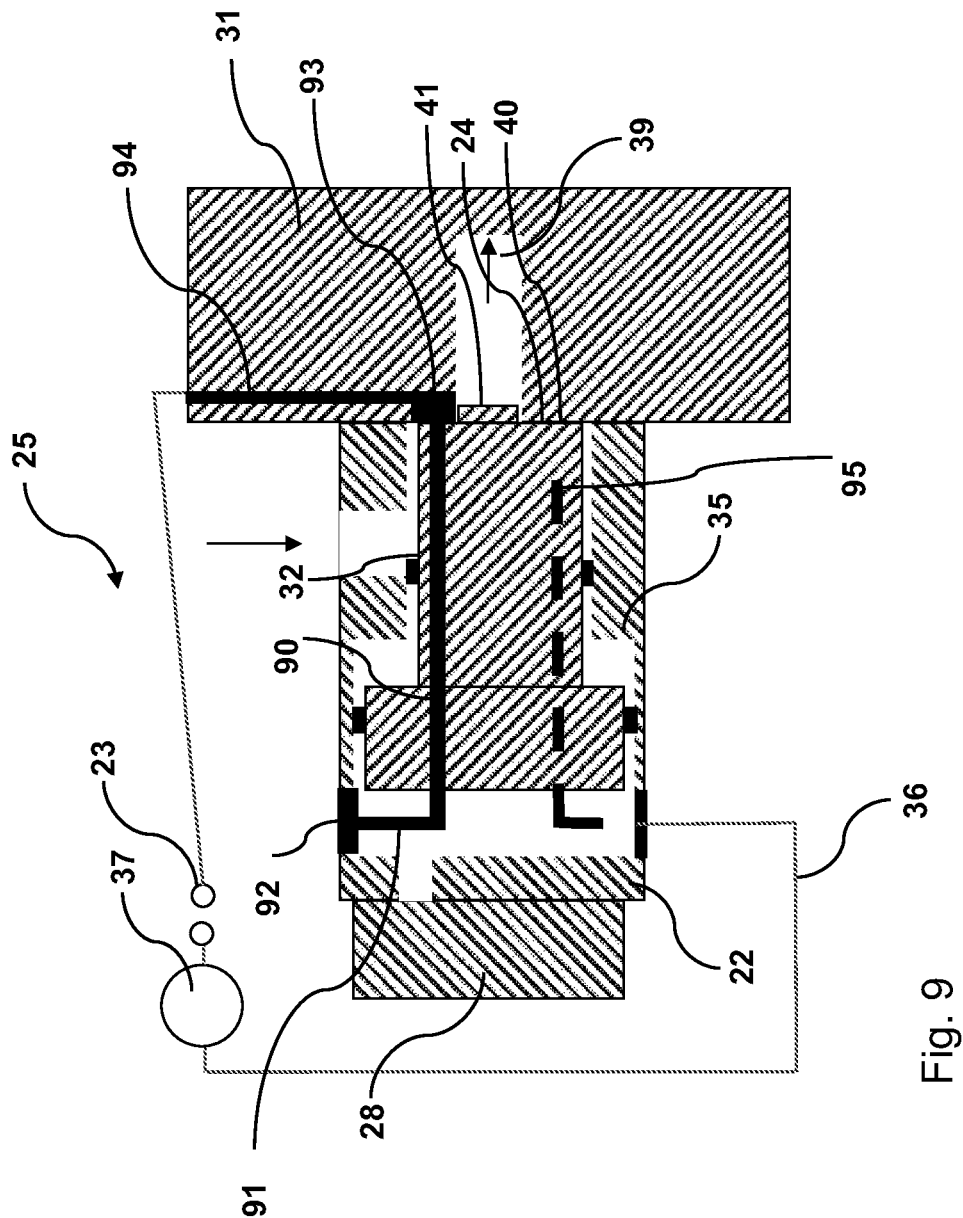
FIG. 9 shows a worn valve in the closed state according to a further embodiment of the present invention.

FIG. 9 shows a further embodiment of the present invention. Shown is a valve assembly 25 with a worn valve as in FIG. 4. The wear of the contact surface 33 of the valve piston 32 is more advanced and instead of a flat contact surface 33, it has a lower lying worn area 40, which is in contact with the contact surface 24 of the valve block 31 and a higher lying non-worn area 41, which protrudes a little into the channel to the blow mould. The shown embodiment of a wear detection device shows a metal piece 90 integrated in the valve piston, which may be designed as a wire. In the extension of the metal piece 90, a (movable) sliding contact 91 is arranged, which is in (stationary) electrically conductive contact with a metallic valve inner wall or a metallic section of the valve inner wall 92. This in turn is connected to a pole of the current source 23 via a measuring device 37 for detecting a current flow. Furthermore, the valve block 31 has a metallic contact surface 93 which is connected to the second pole of the current source 23 via an electrically conductive line 94. In a worn condition of the valve, an electric circuit is closed between the metal part 90 and the metallic contact surface 93, allowing the measuring device 37 to detect a current flow and thus wear. In a non-worn condition of the valve (not shown here), the metal part 90 is completely surrounded by the material of the valve piston 32, wherein no electrically conductive contact between the metal part 90 and the metallic contact surface 93 exist.

In an alternative embodiment, which is only indicated here in the form of a further metal part 95, it would be conceivable to arrange a further metal part 95 or several further metal parts in addition to the metal part 90, which can be used for monitoring different types of wear. For example, it is conceivable to have an end of the metal part 95 spaced further away from the contact surface 33 in the direction of the contact surface 33 in a non-worn state of the valve than is the case for the metal part 90. In the state of the valve shown in FIG. 9, the valve piston 32 is worn to the extent that there is electrically conductive contact between the metal part 90 and the corresponding metal contact surface 93. The end of the further metal part 95, however, is still completely surrounded by the material of the valve piston 32 and there is no contact between the further metal part 95 and a corresponding metallic contact surface (not shown). Now, if the wear of the valve piston 32 progresses further, the end of the further metal part 95 can be exposed and an electrically conductive contact can be made between it and the corresponding (not shown) metallic contact surface. In addition, it may be provided that the other end of the further metal part 95 is connected to a further measuring device and a further current source (not shown) via a sliding contact and a corresponding metallic contact on the inner wall of the valve and can detect further wear in an analogous manner.

Figure 10:
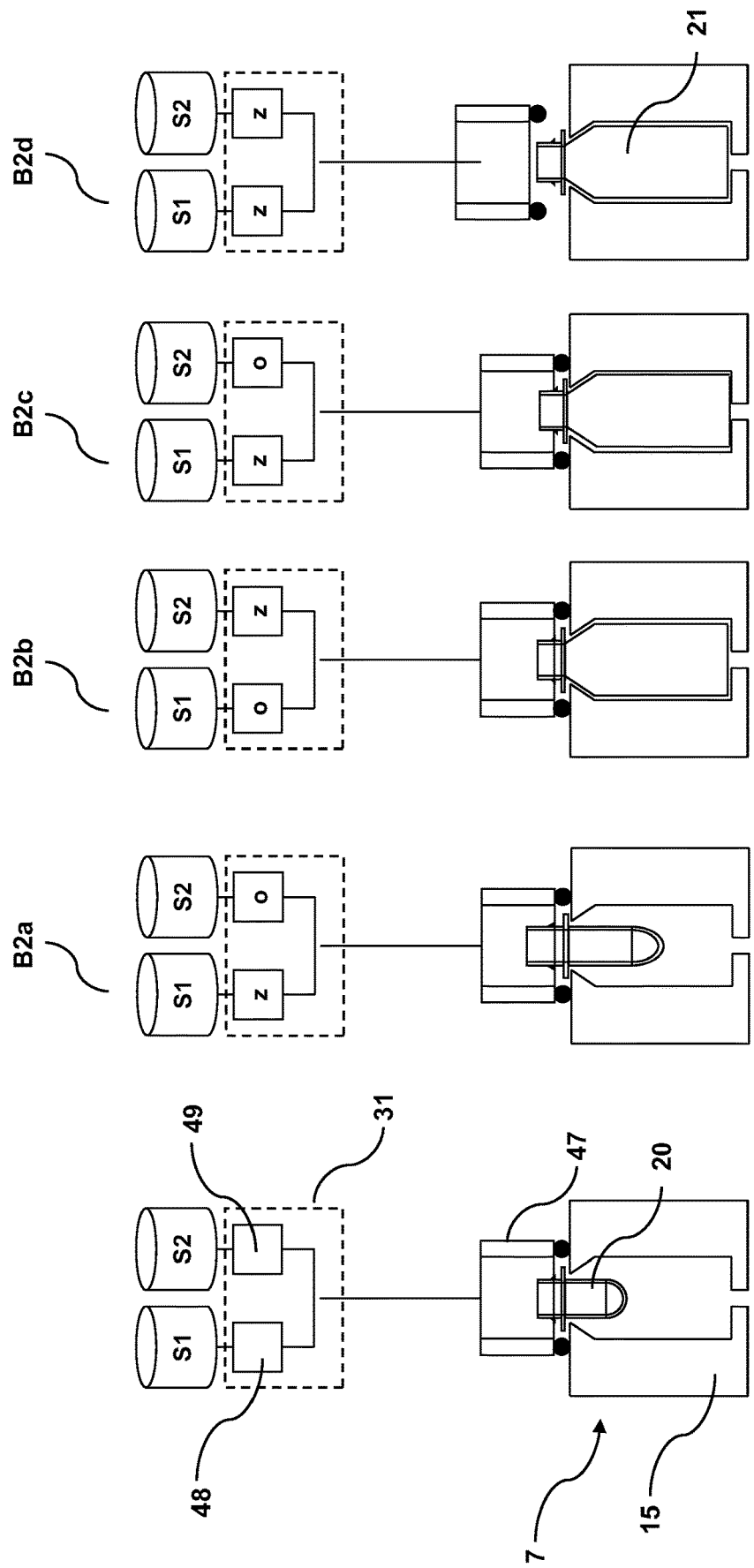
FIG. 10 shows a schematic representation of a blowing station and steps of a blowing process in a second operating mode.

FIG. 10 shows a schematic application of a method according to the invention for operating a blowing station in a second operating mode in which all valves function properly. A blowing station 7 is shown in which a plastic preform 20 is formed into a plastic bottle 21. The blowing station 7 has a valve block 31 with a first valve 48 and a second valve 49, wherein the first valve 48 being connected to a pressure reservoir S1 (finished blowing pressure) and the second valve 49 being connected to a pressure reservoir S2 (pre-blowing pressure). The valve block 31 is arranged on the blowing nozzle 47, which in turn is arranged tightly on the blow mould 15. In a first process step B2a (pre-blowing), the first valve 48 is closed (z) and the second valve 49 is open (o), whereby the blow mould and thus the plastic preform 20 is applied with compressed air under the pre-blowing pressure of, for example, 5 to 20 bar prevailing in the pressure reservoir S2. In a second process step B2b (final blowing), the second valve 49 is closed and the first valve 48 is open, whereby the blow mould and thus the plastic preform 20 is applied with compressed air under the final blowing pressure of, for example, 15 to 35 bar prevailing in pressure reservoir S1, wherein the final blowing pressure being greater than the pre-blowing pressure. In a third process step B2c (recycling), the first valve 48 is closed and the second valve 49 is opened, whereby the air in the blow mould 15, which is still under the final blow pressure of the pressure reservoir S1, is released into the pressure reservoir S2 until the same pressure level is present in the blow mould 15. In a fourth and final process step B2d (venting), both valves 48 and 49 are closed and the pressure is released from the blow mould by lifting the blowing nozzle 47 and the finished blow-moulded plastic bottle 21 can be removed. Alternatively (not shown here), the remaining residual pressure can be released into an outlet opening E via a further valve.

Figure 11:
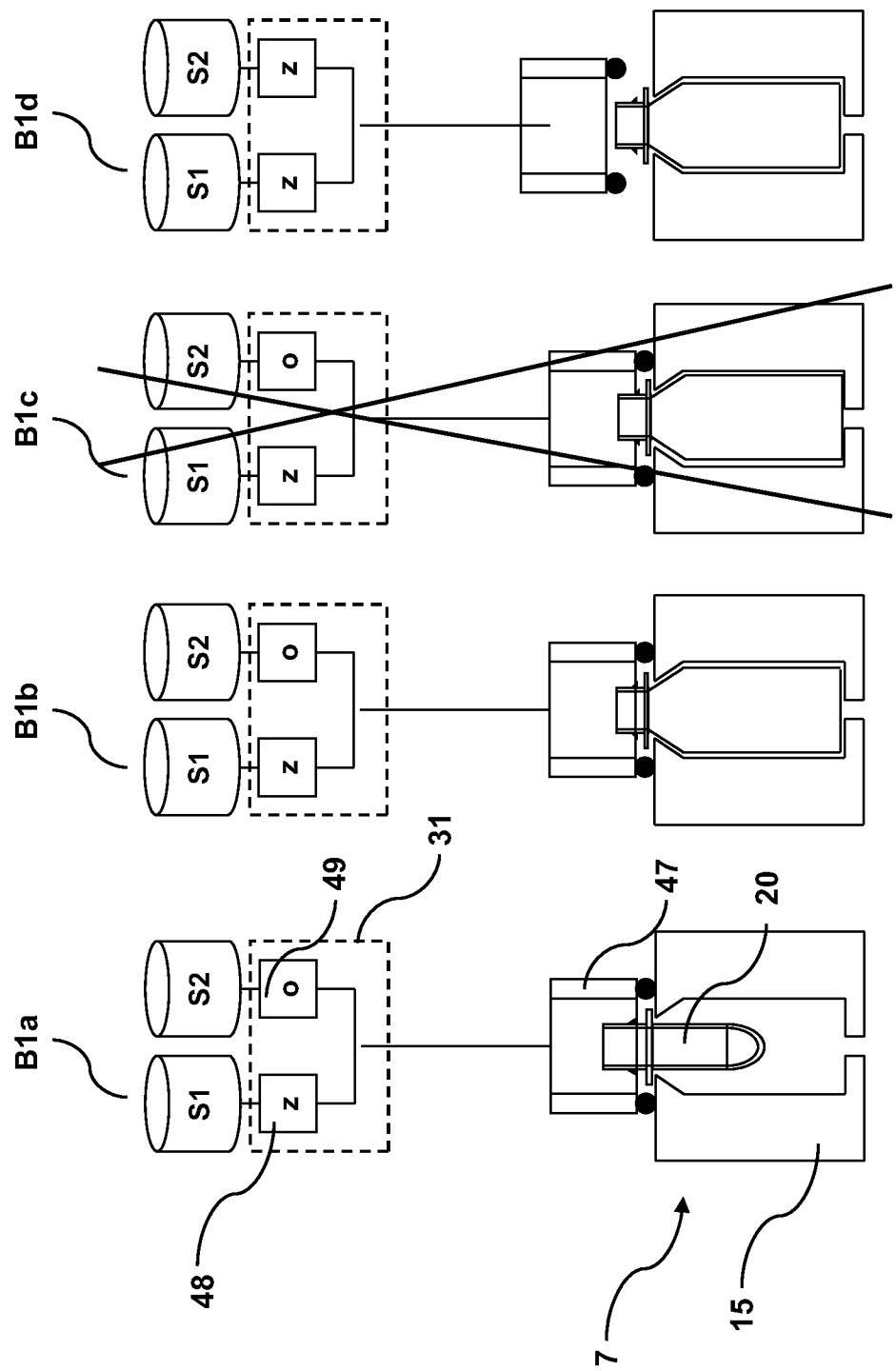
FIG. 11 shows a schematic representation of a blowing station and steps of a blowing process in a first operating mode.

FIG. 11 shows a schematic application of a method according to the invention for operating a blow station in a first operating mode in which a valve is defective and therefore permanently closed. In this case, the first valve 48 is defective and therefore closed. In the embodiment shown, the second valve 49 can be designed as a controllable proportional valve with which lower flow rates can also be achieved, wherein the second valve 49 is connected to pressure reservoir S2. Thus, it is possible to carry out the first two process steps B1a (pre-blowing) and B1b (final blowing), but it is not possible to carry out the third process step B1c (recycling). In this case, the complete pressure must be released by lifting the blowing nozzle 47 in process step B1d (venting). In this case, the pressure reservoir S2 can be filled with a higher pressure inside the console, e.g. by means of a valve not shown in a connection between S1 and S2. Alternatively, in the event of valve 48 wearing out, valve 49 could be connected to pressure reservoir S1 by reconnecting the hoses (manually or automatically).

Figure 12:
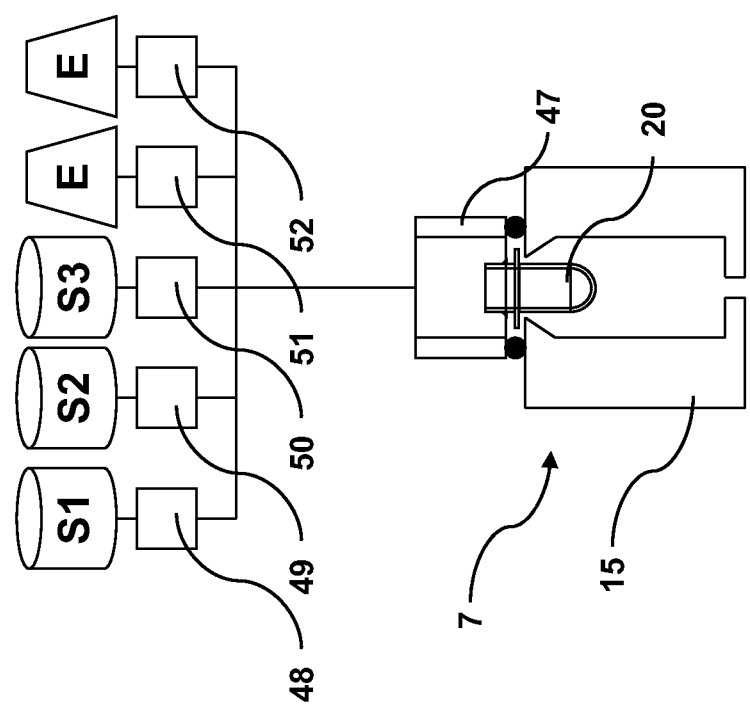
FIG. 12 shows a schematic representation of a blowing station with five valves.

FIG. 12 shows a schematic application of a method according to the invention for operating a blowing station with five valves. Shown is a first valve 48, which is connected to a pressure reservoir S1 (finished blowing pressure), a second valve 49, which is connected to a pressure reservoir S2 (intermediate blowing pressure), a third valve 50, which is connected to a pressure reservoir S3 (pre-blowing pressure) and a fourth 51 and fifth valve 52, which are both connected to an outlet E for venting. In a first application example, all five valves are functioning and the system is operated in a second operating mode. The blowing process in this case comprises the steps: All valves closed, opening of the third valve 50 (pre-blowing), closing of the third valve 50, opening of the second valve 49 (intermediate blowing), closing of the second valve 49, opening of the first valve 48 (final blowing), closing of the first valve, opening of the second valve 49 (recycling to the pressure reservoir S2), closing of the second valve 49, opening of the third valve 50 (recycling to the pressure reservoir S3), closing of the third valve 50, opening of the fourth 51 and fifth 52 valves (venting of the blow mould).

In a second example of use, the second valve 49 is worn and therefore permanently closed, whereby preventing the steps of intermediate blowing and recycling to the reservoir S2. In this case, in a first operating mode, the steps comprise:

all valves closed, opening of the third valve 50 (pre-blowing), closing of the third valve 50, opening of the first valve 48 (final blowing), closing of the first valve 48, opening of the third valve 50 (recycling into the pressure reservoir S3), closing of the third valve 50, opening of the fourth 51 and fifth 52 valves (venting of the blow mould).

The steps may also slightly overlap in embodiments where, for example, 48 is in an inflow line which is not the same as that of the other valves 49-52, e.g. on or in series with a hollow stretch rod 45 (not shown).

In a third example of use, the second valve 49 and the fifth valve 52 are worn and therefore permanently closed, whereby the steps of intermediate blowing and recycling into the pressure reservoir S2 cannot be carried out and venting of the blow mould can only be carried out via the fourth valve 51 and not via the fifth valve 52. In this case, in a first operating mode, the steps comprise: all valves closed, opening of the third valve 50 (pre-blowing), closing of the third valve 50, opening of the first valve 48 (final blowing), closing of the first valve 48, opening of the third valve 50 (recycling into the pressure reservoir S3), closing of the third valve 50, opening of the fourth 51 valve (venting of the blow mould).

The applicant reserves the right to claim all features disclosed in the application documents as essential to the invention, provided they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

LIST OF REFERENCE SIGNS

1 apparatus
2 feeding device, sawtooth starwheel
3 heating device
4 infeed star
5 gripper
6 blowing wheel
7 blowing station
8 compressor with compressor stages
9 compressed air supply line
10 compressed air return line
11 removal starwheel
12 gripper
13 rotary distributor
14 line
15 blow mould
20 plastic preform
21 plastic container, plastic bottle
22 valve sleeve
23 current source
24 contact surface valve block
25 valve arrangement
26 seal
27 seal
28 pilot valve
29 head area valve piston
30 valve unit
31 valve block
32 valve piston
33 contact surface valve piston
34 metallic contact surface valve piston
35 metallic contact surface valve block
36 electric line
37 measuring device, measuring instrument
38 supply line from pressure reservoir
39 supply line to the blow mould
40 worn area of the valve piston contact surface
41 non-worn area of the valve piston contact surface
42 metallic toggle switch
43 induction sensor
44 valve block holder
45 stretch bar
46 plastic sealing surface
47 blowing nozzle
48 first valve
49 second valve
50 valve
51 valve
52 valve
60 valve arrangement
61 valve piston
62 metallic contact surface
69 production management system
70 SPS
71 ERP/MES
72 cloud, internet
73 database, server
80 filling device
81 filling device
90 metal part
91 sliding contact
92 valve inner wall
93 metallic contact surface
94 electrically conductive line
95 further metal part
B1*a* first operating mode, preblowing
B1*b* first operating mode, finish blowing
B1*c* first operating mode, recycling
B1*d* first operating mode, venting by lifting the blowing nozzle
B2*a* second operating mode, preblowing
B2*b* second operating mode, finish blowing
B2*c* second operating mode, recycling
B2*d* second operating mode, venting by lifting the blow nozzle
E outlet
o valve open
z valve closed
E outlet
S1, S2, S3, S4 pressure reservoir

The invention claimed is:

1. An apparatus for treating containers with a transport device for transporting a container along a predetermined transport path, wherein the apparatus comprises at least one container treatment device, wherein the at least one container treatment device comprises at least one wear element, wherein the at least one container treatment device comprises a wear detection device configured for detecting wear data relating to wear of the at least one wear element, wherein the wear detection device comprises at least one sensor device configured for detecting the wear data relating to wear of the at least one wear element, wherein the at least one wear element is a valve and/or a valve piston of a valve for supplying and/or discharging a flowable medium.

2. The apparatus according to claim 1, wherein the apparatus comprises a communication device for transmitting wear data relating to the wear of the at least one wear element to a non-volatile memory device.

3. The apparatus according to claim 1, wherein
a surface of the valve piston and an associated contact surface of the at least one container treatment device, has an electrically conductive material at least in regions.

4. The apparatus according to claim 3, wherein
the surface of the valve piston is at an angle >1° and <179° to a vector of a direction of movement of the valve piston along which the valve piston is moved when the valve is opened or closed.

5. The apparatus according to claim 3, comprising
an electric circuit configured to be closed by a contact between the surface of the valve piston and the associated contact surface of the container treatment device.

6. The apparatus according to claim 5, wherein
the at least one sensor device is configured to detect a current flow in the closed electric circuit.

7. The apparatus according to claim 1, wherein
the at least one container treatment device comprises a metallic switch configured to close an electric circuit upon contact with the surface of the valve piston.

8. The apparatus according to claim 1, wherein
the at least one sensor device comprises an induction sensor configured to detect the distance between the surface of the valve piston and the induction sensor.

9. The apparatus according to claim 1, wherein
the wear detection device is set up for monitoring the wear behavior of the wear element, wherein the wear behavior of the wear element comprises a wear of a movable component.

10. The apparatus according to claim 9, wherein
the sensor device records wear data in relation to the wear behavior as a function of a condition of the wear element.

11. The apparatus according to claim 9, wherein
the wear behavior depends on the operating conditions.

12. The apparatus according to claim 1, wherein
at least one valve can be activated and/or deactivated depending on the detected wear data.

13. The apparatus according to claim 1, wherein
the sensor device only acquires wear data when a certain degree of wear of the wear element has been reached.

14. An apparatus for treating containers with a transport device for transporting a container along a predetermined transport path, wherein the apparatus has at least one container treatment device, wherein the at least one container treatment device has at least two valves via which a flowable medium can be supplied to a container and/or discharged from the container,
wherein the at least one container treatment device is operable in a first and in a second operating mode,
wherein in a first operating mode at least one valve is active and at least one valve is not active, and in a second operating mode all valves are active and/or the apparatus comprises a wear detection device configured for detecting wear data with respect to wear of one of the at least two valves, wherein an active valve is configured to be activated and/or switched by a machine control within the scope of its intended functions, and wherein a deactivated valve is configured to not be activated and/or switched by the machine control.

15. The apparatus for treating containers according to claim 14, wherein
the at least one container treatment device has at least three valves and a valve block on which at least two valves are arranged.

16. A method for treating containers with a transport device which transports a container along a predetermined transport path, with at least one container treatment device, wherein the at least one container treatment device has at least one wear element, wherein the at least one container treatment device has a wear detection device configured for detecting wear data relating to wear of the at least one wear element, wherein the wear detection device has a sensor device, and with a communication device for transmitting wear data relating to wear of the at least one wear element, wherein
the sensor device directly detects the wear data relating to wear of the at least one wear element.

17. The method for treating containers according to claim 16, wherein the
at least one wear element is a valve piston of a valve configured for supplying and/or discharging a flowable medium and/or the at least one valve is configured to be activated and/or deactivated as a function of the detected wear data.

18. A method for treating containers with a transport device which transports a container along a predetermined transport path, with at least one container treatment device, wherein the at least one container treatment device has at least two valves configured to feed a flowable medium to a container and/or discharge it therefrom,
wherein
the at least one container treatment device is operable in a first operating mode in which at least one valve is deactivated and at least one valve is activated and/or is operable in a second operating mode in which all valves are activated.

19. The method for treating containers according to claim 18, wherein
in the first operating mode the at least one deactivated valve is a recycling valve and/or a change between the first operating mode and the second operating mode can be performed without stopping the at least one container treatment device.

* * * * *